United States Patent [19]

Lang et al.

[11] Patent Number: 5,480,307
[45] Date of Patent: Jan. 2, 1996

[54] TRAINING AND PRACTICE APPARATUS FOR SIMULATING AND PRACTICING CLINICAL DENTAL PROCESSES

[75] Inventors: Hans-Walter Lang, Leutkirch; Alfred Straka, Isney; Frank Berlinghoff, Herlazhofen, all of Germany

[73] Assignee: Kaltenbach & Voigt GmbH & Co., Biberach/Riss, Germany

[21] Appl. No.: 129,145

[22] PCT Filed: Jan. 21, 1993

[86] PCT No.: PCT/EP93/00133

§ 371 Date: Oct. 7, 1993

§ 102(e) Date: Oct. 7, 1993

[87] PCT Pub. No.: WO93/16457

PCT Pub. Date: Aug. 19, 1993

[30] Foreign Application Priority Data

Feb. 11, 1992 [DE] Germany .................. 42 03 957.6

[51] Int. Cl.⁶ .................................................. G09B 23/28
[52] U.S. Cl. ........................................ 434/263; 434/262
[58] Field of Search .................................. 434/262, 263, 434/264, 270, 267, 274, 275

[56] References Cited

U.S. PATENT DOCUMENTS

| 3,520,060 | 7/1970 | Crabtree et al. ........................ 32/71 |
| 3,557,471 | 1/1971 | Payne et al. ........................ 434/270 |
| 3,707,782 | 1/1973 | Alderson ........................ 434/267 |
| 3,762,069 | 10/1973 | Culver ........................ 434/274 |
| 4,035,920 | 7/1977 | Saupe ........................ 434/263 |
| 5,102,340 | 4/1992 | Berling-Hoff et al. ........................ 434/263 |
| 5,158,488 | 10/1992 | Berlinghoff et al. ........................ 434/263 |

FOREIGN PATENT DOCUMENTS

| 1033151 | 2/1951 | France . |
| 2111049 | 7/1972 | France . |
| 2483105 | 11/1981 | France . |
| 2451618 | 5/1976 | Germany . |
| 2531436 | 1/1977 | Germany . |
| 7737839 | 4/1978 | Germany . |
| 2053255 | 6/1979 | Germany ........................ 434/263 |
| 3941332 | 6/1991 | Germany . |
| 1303407 | 1/1973 | United Kingdom . |
| 1519517 | 7/1978 | United Kingdom . |

OTHER PUBLICATIONS

"The Head of the Dental Class" by Ilene Barth, Parade, Nov. 5, 1972.

Primary Examiner—Gene Mancene
Assistant Examiner—Jeffrey A. Smith
Attorney, Agent, or Firm—Fitzpatrick, Cella, Harper & Scinto

[57] ABSTRACT

In a training and practice apparatus (1) for simulating and practising clinical dental processes, with a model bust (6) which has a chest part, a neck (16) and a head (7) and is swivel-mounted on a carrier (4), the head (7) is mounted on a head carrier by means of a joint (17) and can thereby be swivelled into different working positions and fixed in the adopted swivel position, the joint (17) is arranged in the neck (16), the neck (16) has an engagement recess (28) opening approximately coaxially at its bottom end and the head carrier is a bearing rod, engaging in the engagement recess, on which the joint (17) is arranged and which is mounted in the chest part.

22 Claims, 8 Drawing Sheets

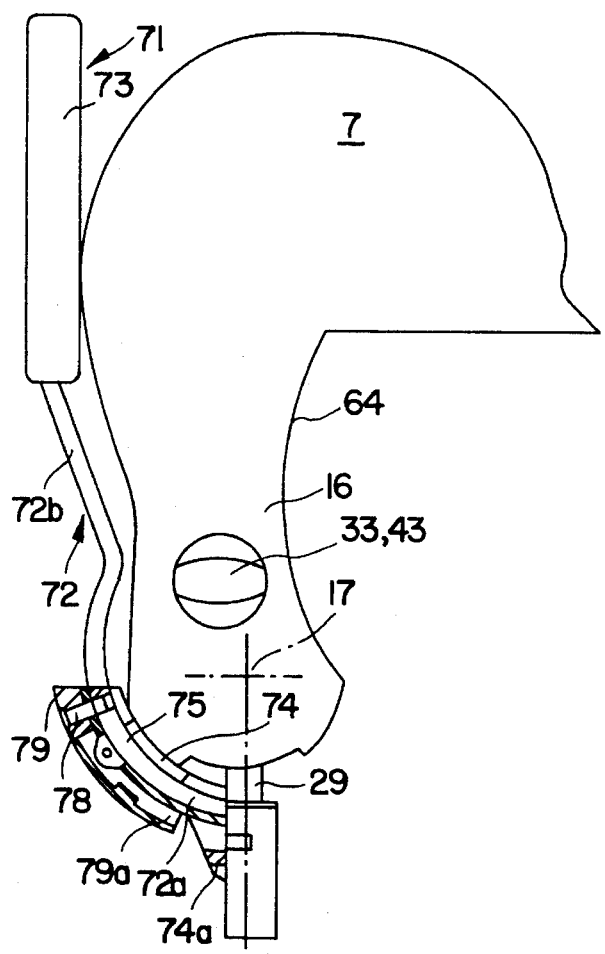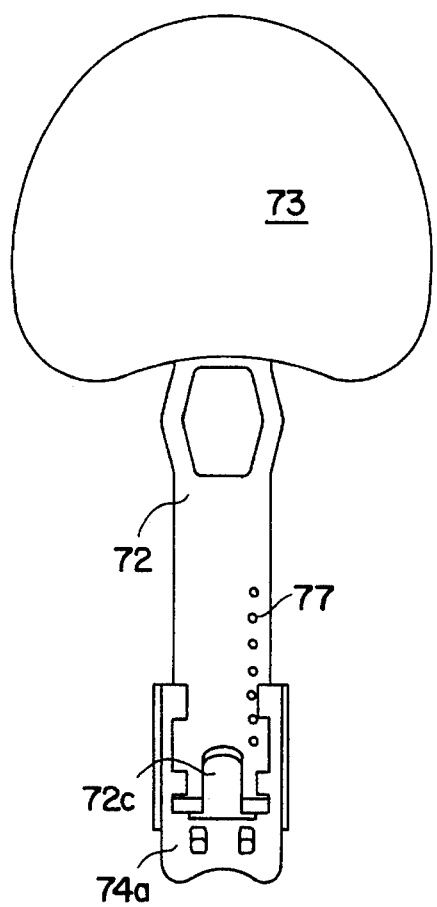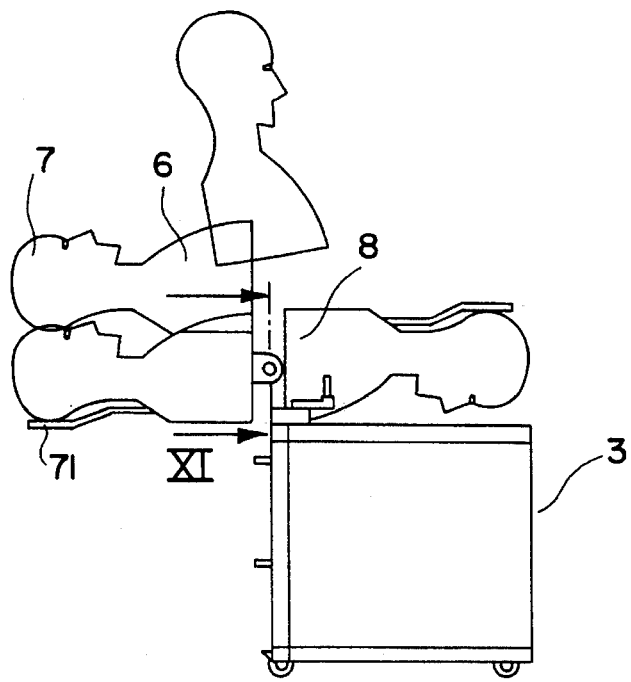

TRAINING AND PRACTICE APPARATUS FOR SIMULATING AND PRACTICING CLINICAL DENTAL PROCESSES

BACKGROUND OF THE INVENTION

Field of the Invention

The invention relates to a training and practice apparatus.

The intention and purpose of such a training and practice apparatus is to enable the user to have a working situation that is as lifelike as possible as regards the human body, so that the user can carry out his training and practice activity in the presence of the anatomical conditions of an average adult human being. In this case the mounting of the model head presents a special problem because for a variety of dental treatments different head positions need to be adopted in order to achieve a satisfactory head position and assure comfortable treatment.

DESCRIPTION OF THE PRIOR ART

A training and practice apparatus for simulating and practising dental processes with a model head or a model bust is described in DE 39 41 332 C2, the head being carried by a neck fixed to it. The model head or the model bust is mounted on a carrier so that it can swivel in a vertical plane. The neck approximates to the natural shape and dimensions of the human neck. The possibility of further head movements is not described in this publication.

A head model for the training and practising of the taking of dental X-rays is described in US 35 20 060. This known head model consists of a head core and a head cover made of soft plastic material which can be pulled over the core, the head cover comprising a neck of a size and shape which corresponds to human size and shape. The head core is pivot-supported by means of a neck rod with a ball joint, which is fixed to the head core. In this known model head the neck consists of a soft material which cannot perform any bearing function. The neck rod is directly fixed to the head core.

DE-GM 77 37 839 describes a model head with no neck, the model head being swivel-mounted in a ball joint and fixable in the appropriate swivel position, the joint being arranged in the area of the back of the head. The ball joint is arranged at the top end of a bearing rod which can be fixed to a bearing plate according to FIG. 4.

A configuration similar to the configuration described above can be found in DE 25 31 436 B2, the back of the head being formed as part of the ball joint in this configuration.

DE 24 51 618 A1 described a model head which is movably mounted by means of a support component similar or corresponding to a dentist's chair backrest and adjustable according to the movements of the backrest in its inclination to the horizontal as well as according to height, the model head being mounted on the support component in the area of its free end. According to FIG. 7 this model head is adjustably mounted on a rod which essentially extends vertically. A neck is not provided. Although an impediment structure corresponding to the human upper body is provided it is arranged on the available backrest separate from the head.

A disadvantage of the known configurations lies in the fact that they are very unattractive and do not therefore encourage the user's training and practice activity. In addition the head movements that are normal for them do not correspond to the natural head movements of an average adult human being.

A further disadvantage lies in the fact that the associated joint is directly accessible manually from the outside, so that there is the risk of pinching and injury to the user's hands when adjusting and setting the joint. This risk exists not only in the immediate area of the joint between the joint parts present, in particular in their stop area, but also between the lower end of the head area and the neck rod, and particularly when the joint is at the end of the neck rod which faces the head.

SUMMARY OF THE INVENTION

The object of the invention is to design a training and practice apparatus of the kind described above in such a way that a simple and untroublesome mounting for the head is achieved which permits lateral swivel movements and pitch movements of the head and a fixing of the head in the appropriate movement position.

Furthermore, interference with the user's hands, in particular the risk of pinching or injuries, should be avoided. It should also be possible to be able to adjust and fix the model head simply and easily so that the user has to pay as little attention as possible to this mechanical adjustment and fixing work. Furthermore, as accurate as possible a setting is required.

The invention comprises several solutions which are advantageous both in themselves in each case and in individual or multiple combinations. Not only does the model head have a shape corresponding to the anatomy of a preferably adult average human being, it also enables the joint to be covered, so that the above-mentioned risk of interference or injury to the user's hand is avoided. This is achieved by the joint being arranged in the neck and the bottom neck end being a relatively large distance away from the model head or neck joint. The embodiment according to the invention also gives the model head a pleasant exterior, which contributes to the attempt to provide the user with a working situation which resembles the anatomical circumstances of the human body as closely as possible. The invention also permits easy fixing and release of the joint.

A further advantage of the embodiment according to the invention consists of the fact that the position of the joint in the neck is closer to the anatomy of the human body than is the case in the known configurations. If the joint is arranged approximately in the central longitudinal area of the neck, this produces an advantageous position which comes fairly close to natural movement. It is advantageous to mount the model head according to the invention on a bearing rod which extends coaxially to the neck and engages in it in an engagement opening at the bottom end of the neck. A ball joint whose ball socket bounds the engagement opening in the direction of the model head can also be simply achieved. The cross-sectional size of the engagement opening should be so dimensioned at the bottom end of the neck, account being taken of the cross-sectional size of the bearing rod, that the desired swivel movements can be carried out. A fixing device which is effective and/or can be activated in any swivel position can be associated with the ball joint in that a wall part of the ball socket can be tensioned against the joint ball by means of a tensioning element and thereby creates friction. In this case a frictional and/or clamping tension force is recommended which on the one hand is sufficiently strong that it holds the model head in its desired working position under the stresses that occur during treatment and on the other hand can be overcome in order to adjust the model head so that the joint does not need to be fixed and released. An elastic tensioning force, which can preferably be exerted by a compression spring, is very suitable for this. To achieve variable tensioning forces and fixing forces for the joint, a thrust wedge gear is suitable, with which a pressure element can be acted upon to a greater or lesser extent on the basis of wedge action in order to change the variable tensioning or clamping action in the joint. A setting element which engages through the neck to the outside and is thus accessible and manually operable is very suitable. The arrangement should preferably be made in such a way that a change in the clamping or compressive force can be carried out by manual action on the setting element without a tool. This can be achieved by a reducing gear being operative between the setting element accessible from outside and the clamping or pressure element. A combined spindle drive/thrust wedge gear is very advantageous in this case and permits an easy and fine setting of the clamping and/or compressive force.

A contribution to the achievement of the requirements described above is made if a model bust representing an upper body or chest area and which is separated from the neck of the model head by means of a partition joint and thus permits its optional swivelling, is associated with the model head. An advantageous embodiment is achieved if the model bust has a neck hole opposite the bottom end of the neck into which this preferably engages with a hemispherical curve. This enables an advantageous and essentially enclosed transition between neck and bust to be created. A bearing rod carrying the joint ball of the neck joint can be mounted in the bust and go through the neck hole to the outside.

It is also advantageous to associate a back-of-the-head support with the model head and thus create a support for the model head which is independent of the joint and therefore makes it possible to move the head with the joint released or slack and with the model head supported on the back-of-the-head support, in order, for example, to carry out certain treatment methods. Basically a back-of-the-head support leads to a stabilization of the mounting of the model head so that its neck joint need not be of such rugged construction. The back-of-the-head support according to the invention therefore also enables treatments to be carried out with the joint released or slack. A back-of-the-head support which can be adapted to the vertical movement of the model head and can be fixed accordingly makes the advantages mentioned above possible even when the model head is in different positions. To adjust the back-of-the-head support, a curved guide shaped like a circle segment is preferably suitable for the back-of-the-head support, which is preferably arranged on the bearing rod of the model head and can be adjusted, for example steplessly by means of clamping or step-wise by means of a lock.

A further contribution towards providing with a model head a working situation which corresponds to the anatomical circumstances of the human body is made if a guide is associated with the joint which limits the degrees of freedom of the joint in such a way that they correspond to the anatomical possibilities of the average human being. In particular this helps the user to become accustomed to the limits of these degrees of freedom and hence to the range of movement of the model head.

For an optimal model head setting, it is also advantageous to associate with the head carrier a further joint which corresponds to a back or hip joint and permits a stepless or step-wise swivelling of the model head in a vertical plane. This changes not only the working height of the model head but also its inclination so that particular working positions for the model head can be obtained and/or set. The handling required for this is greatly facilitated if this joint is or can be stiffened in such a way that on the one hand it can absorb the working stresses without movement and on the other hand is arbitrarily adjustable, preferably by overcoming the stiffness of the joint manually. Suitable for this is preferably a friction coupling with friction discs whose friction and/or clamping force is variable and adjustable, preferably so easily adjustable that it can be adjusted with the user's hand without using a special tool.

It is also of advantage to arrange the head carrier or the bust carrier on a carrier base, preferably in the form of a cabinet, so that its height can be adjusted vertically. The height adjustment enables the model head or bust to be adapted to different height positions independently of its swivel positions. A further reason for a height adjustment may also consist of lowering the model head or the model bust when not in use to such an extent that the model head in a position swivelled into its prone disposition can be pushed under a bench-shaped unit for the performance of technical dental work. A motorized or manual drive can be used for the height adjustment. A spindle drive which can be manually actuated via a crank is suitable. A spindle drive of this kind can easily be operated by both male and female users.

BRIEF DESCRIPTION OF THE DRAWINGS

The invention will be described in greater detail below, with account being taken of several of its aspects and further advantages, with reference to preferred embodiments and the drawings, in which:

FIG. 8 shows a side view of a model head with back-of-the-head support;

FIG. 9 shows a front view of the back-of-the-head support according to FIG. 8;

FIG. 10 shows the apparatus according to FIG. 1 with the model bust in different positions;

DETAILED DESCRIPTION OF THE PREFERRED EMBODIMENTS

Figure 1:
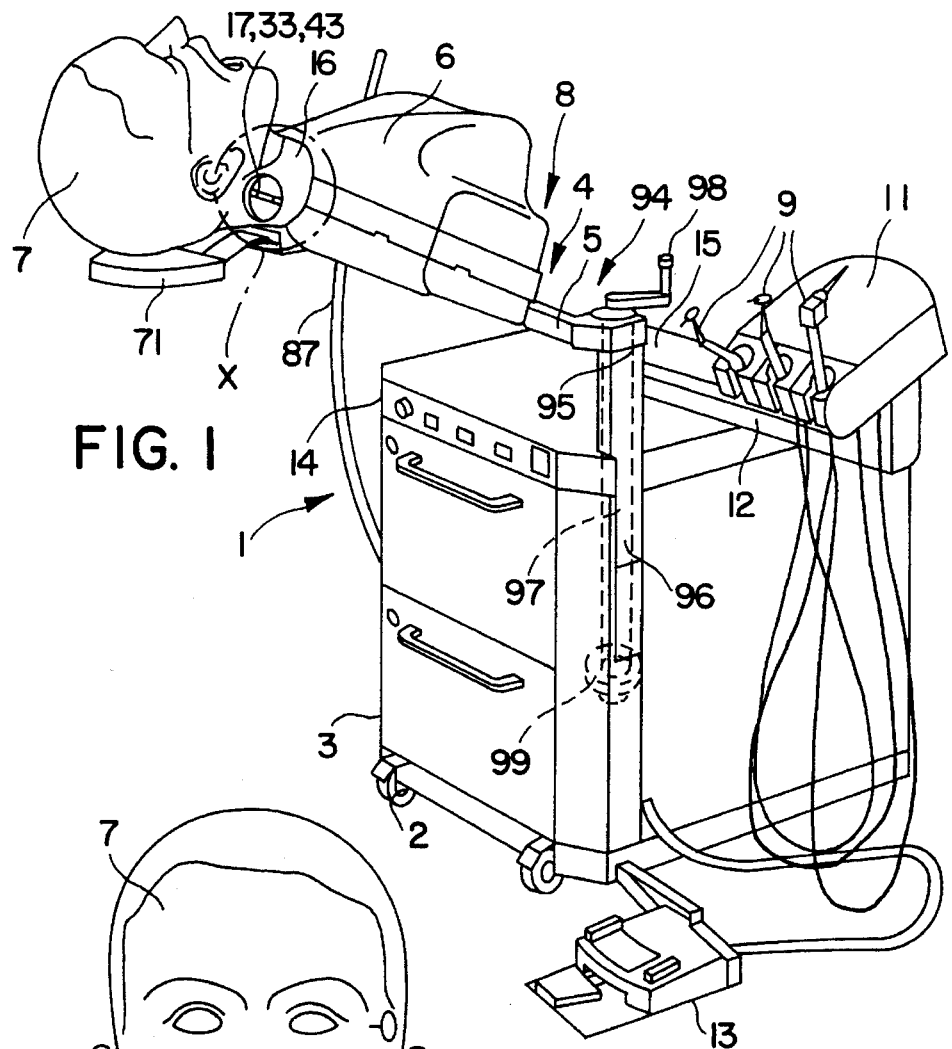
FIG. 1 shows a perspective view of a training and practice apparatus in accordance with the invention for simulating and practising clinical medical processes on a model head with model bust.

The main components of the training and practice apparatus 1 are a frame or cabinet-shaped base 3, stationary or movable on rollers 2 if necessary, in whose upper area a bust or head carrier 4, with a model bust 6 and a model head 7 preferably on a horizontal bearing arm 5 extending parallel to the front of the base 3, is mounted in a swivel joint 8, swivellable in a vertical plane extending from front to back with respect to the base 3 and fixable in the adopted swivel position. FIG. 1 shows the model head in a supine disposition, viz. a working position in which clinical dental or orthodontic processes are carried out in the mouth area.

This can take place by means of treatment instruments 9, which are individual treatment tools or treatment equipment connected to supply hoses which when not in use can be placed on a mounting 11 which is swivel-mounted on a horizontal bearing arm 12 preferably about a vertical swivel axis, the bearing arm 12 being swivel-mounted about a further vertical swivel axis in a joint (not shown) on the top of the base 3 which is preferably in the centre of the top. A foot switch 13 can be provided to control the treatment instruments 9 and other functions if required. Further electrical control elements 14 which are operated manually can be arranged on the front on the cover plate 15 of the base 3.

Figure 4:
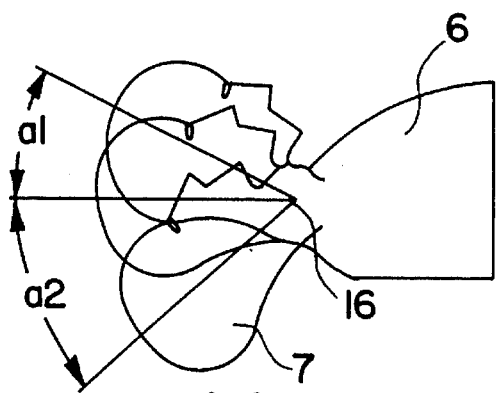
FIG. 4 shows a side view of a schematic representation of the model head in the supine disposition, in various pitch positions.
Figure 5:
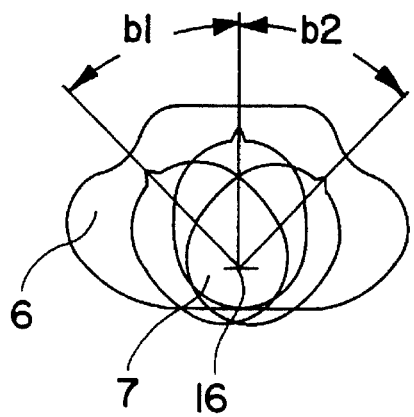
FIG. 5 shows a side view from the left of the model head according to FIG. 4.
Figure 6:
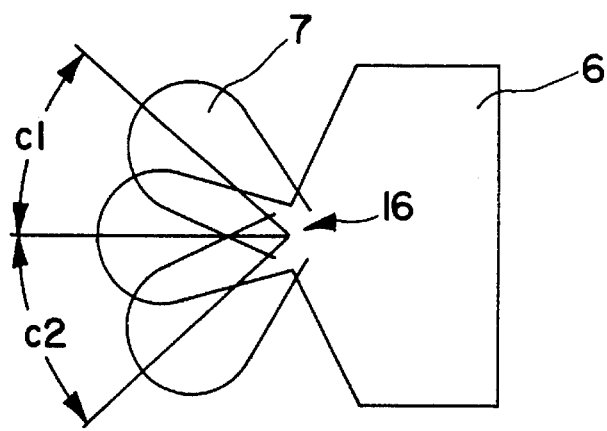
FIG. 6 shows a top view of the model head according to FIG. 4.

The model head 7 preferably has a neck 16 moulded on in one piece, whose cross-sectional size and length are adapted to the neck of an average adult human being and which is manufactured from a material of sufficient strength to be able to carry the head 7. In the area of the neck 16 a neck joint 17 is provided which permits both vertical swivel movements (FIG. 4), rotary movements about the longitudinal axis of the neck 16 (FIG. 5) and lateral swivel movements (FIG. 6) of the model head. The above-mentioned ranges of angular freedom combine with one another as is the case with a human being. This is made possible by means of a ball joint 17a which is preferably arranged approximately in the central longitudinal area of the neck 16 approximately in its longitudinal axis 18. Preferably associated with the ball joint 17a is a limit guide 19, still to be described, which limits the degrees of freedom (FIGS. 4 to 6) of the neck joint 17 in such a way that they correspond to the anatomical possibilities of the average, particularly adult human being. From a normal central position the model head 7 can make a pitch movement a1 upwards through approx. 25°, a pitch movement a2 downwards through approx. 40°, a rotary movement b1, b2 each through approx. 45° and a lateral swivel movement c1, c2 of approx. 40°, these movements merging into one another so that the model head can also make a circular movement.

At its end facing away from the model head 7 the neck 16 is rounded in the shape of a sphere and with the rounded end area it enters a neck opening 21 on the model bust 6 which is preferably formed by a somewhat raised circular collar 22 of the shoulder area 23 of the model bust 6. The free edge 24 of the circular collar 22 has a spacing a (FIG. 2) of approx. 15 to 25 mm from the mid-point of the ball joint 17a. Between the edge 24 and the rounded end area of the neck 16 a partition joint 25 is formed between these parts, which can be a few millimeters or can also be closed if an elastically flexible material is used for the circular collar 22.

Figure 7:
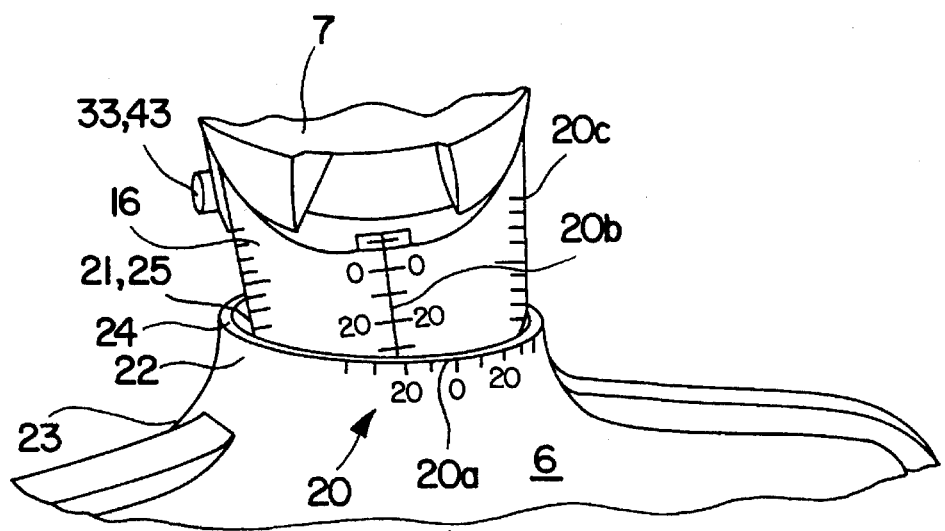
FIG. 7 shows a front view of detail X in FIG. 1.

In the area of the partition joint 25 a pressure and/or pitch angle measuring device 20 (FIG. 7) is associated with the neck 16 and the shoulder area 23, preferably at the front, which is formed in this case by a pressure scale 20a (horizontal) and/or a pitch scale 20b (vertical). Both scales 20a, 20b can be calculated in the neutral mid-position of the model head 7 starting from 9. The indicator for the pitch scale 20b arranged on the neck 16 is the edge 24 of the neck opening 21. The indicator for the pressure scale 20a arranged on the circular collar 22 is the pitch scale 20b.

Figure 2:
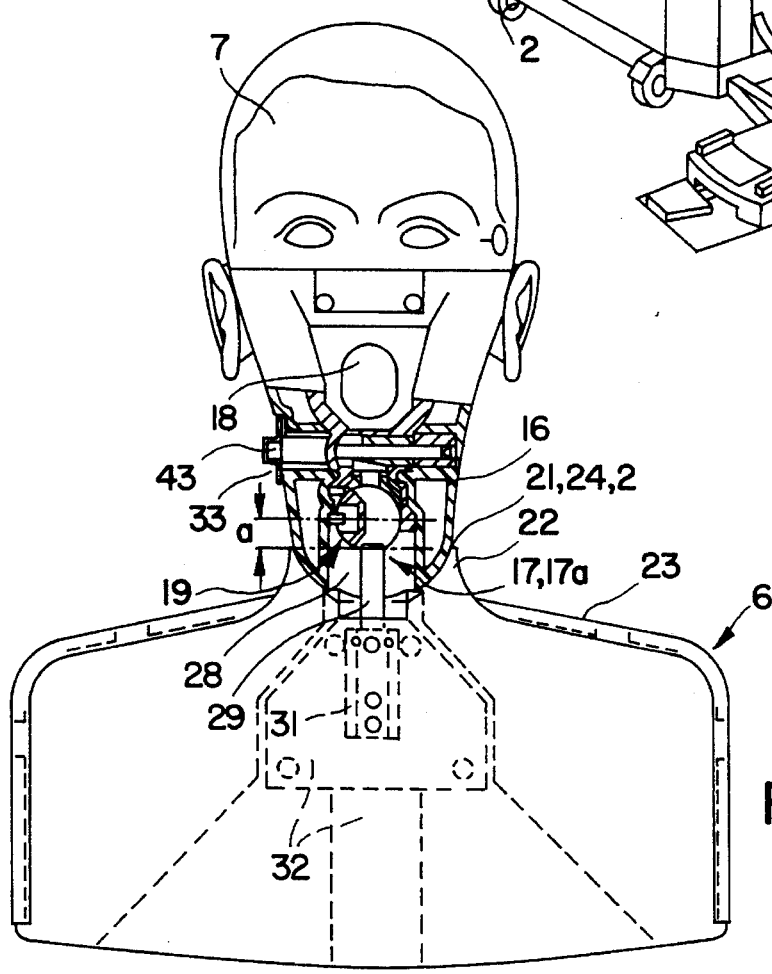
FIG. 2 shows a partly sectional front view of the model head with model bust.
Figure 3:
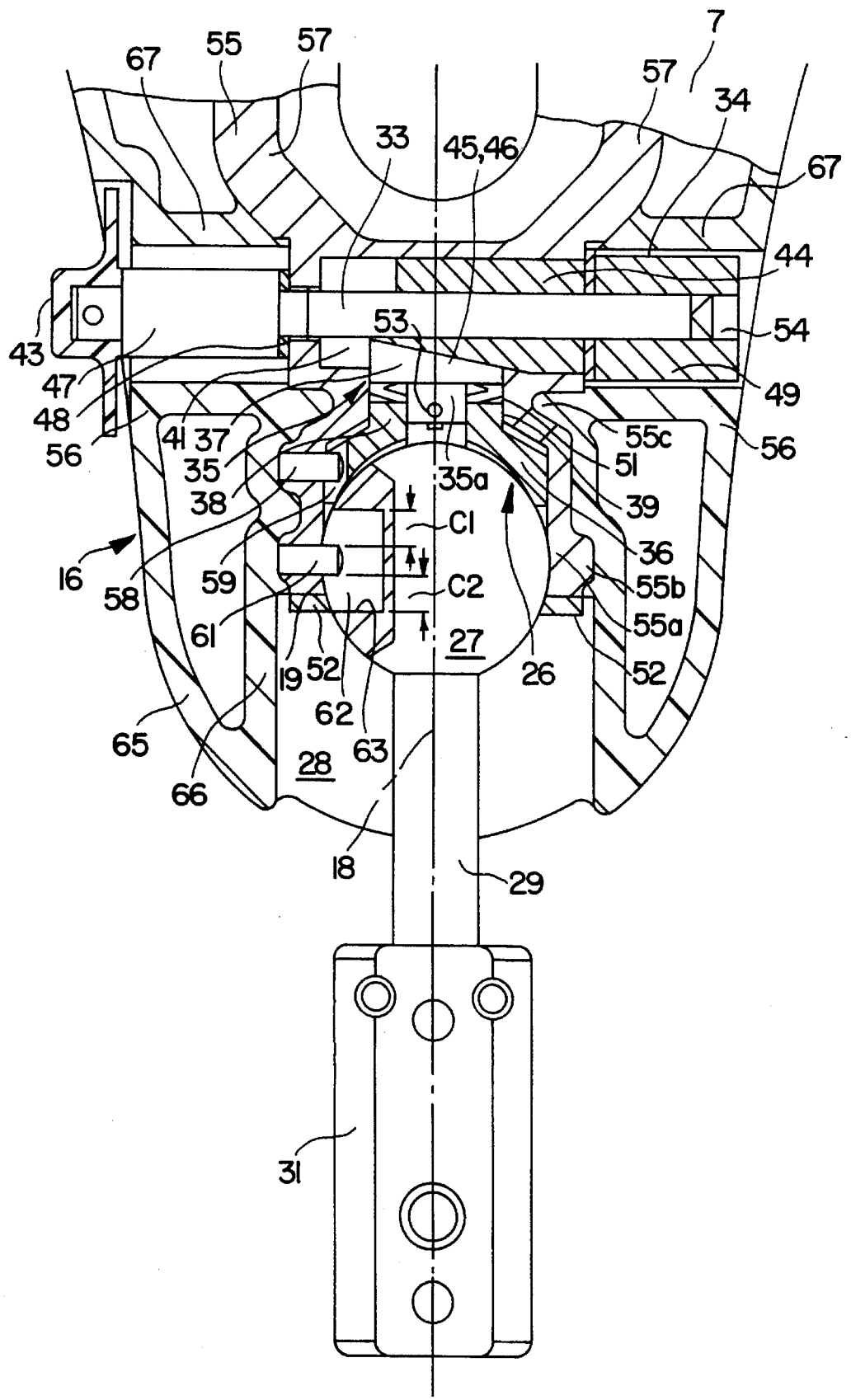
FIG. 3 shows an enlarged view of the detail marked X in FIG. 1.

According to FIGS. 2 and 3 the ball joint 17a is formed by a ball socket 26 and a ball 27, of which the ball socket 26 is formed by the boundary of a coaxial recess of round cross-section 28 which opens at the free end of the neck 16. The ball 27 is fixed to the free end of a bearing rod 29 which is detachably fixed at its bottom end with a rod foot 31 to an internal bearing part of the model bust 6 wholly or partially open at the back or to a bearing part 32 of the swivel joint 8 projecting into the bust 6 and projects into the recess 28. In the normal position above the neck joint 17 the neck 16 is radially passed through by a clamping screw 33 with which the friction and/or slackness or tightness of the neck joint 17 can be optionally set. A hand screw which by means of a gear 34 directly or indirectly presses against a compression piece 35 movably guided along the neck axis 18 or presses a ball socket part 36 against the ball 27 is preferably used for this. In this embodiment the compression piece 35 with a round disc head 37 and the ball socket part 36 with an upper collar 38 are movably mounted in an axial guide hole 39 which extends upwards from the recess space receiving the ball socket part 36 and terminates in a transverse hole 41 in which the clamping screw 33 is situated which preferably extends laterally as far as the periphery of the neck 16 and has a rotary working element fixed there, preferably in the form of a disc with an external rotary web 43 which can be grasped manually. In this embodiment the gear 34 is a wedge gear with a tension wedge 44 which is received non-rotatably in the transverse hole 41 into which the clamping screw 33 is screwed and which with an inclined surface 45 acts against a corresponding inclined surface 46, on the compression piece 35 in this case. The clamping screw 33 rests with a sunken head 47 on a shoulder 48 of the transverse hole 41 and with the free end of its threaded shaft it engages in a nut 49 arranged opposite in the transverse hole 41. Between the compression piece 35 and the ball socket part 36 is arranged a compression spring 51 which stresses the ball socket part 36 against the ball 27 and presses against a circular ball socket cover 52 which rests on the ball 27 opposite the ball socket part 36 and is fixed to the ball socket 26. In this embodiment the compression piece 35 has a coaxial pin 35a which engages in a pin hole of the ball socket part 36 and is mounted on the ball socket part 36 by means of a transverse pin 53 along the neck axis 18 in a movable but non-rotatable manner. In the nut 49 is screwed a setting screw 54, accessible from the outside and preferably pointed, with which the insertion depth of the clamping screw 33 and hence the compressive and/or clamping strain of the neck joint 17 can be limited.

In this embodiment the ball socket 26 is located in an insertion piece 55, preferably of metal, that can be positively inserted transversely into a corresponding recess in the model head 7 and forms the central part of the transverse hole 41 in which the tension wedge 44 sits, transverse hole sections present in the neck walls 56 being aligned therewith on both sides. The shoulder 48 is also formed on the insertion piece 55. The insertion piece 55 also has retaining arms 57 which continue upwards and which serve for fixing onto the model head 7. The ball socket cover 52 is fixed to the bottom edge of the end area 55a of the insertion piece 55 which is open on the underside, receives the ball socket part 36 and is hat-shaped. 58 denotes a locking pin which sits in a transverse hole of the wall of the insertion piece 55 and engages inwards in a recess 59 of the spherical section of the ball socket part 36. It is advantageous to make the arrangement so that the insertion piece 55 can be inserted into the head 7 from the front and transversely to the neck axis 18 and is held positively in the head 7 against displacement along the neck axis 18 by means of 55b and recesses 55c parallel to this insertion direction.

The limit guide 19 is formed by a guide pin 61, arranged radially with respect to the joint ball 27, which is also fixedly inserted into a hole of the ball socket 26, in this case of the end area 55a, and engages in a guide hole 62 in the joint ball 27. In its cross-sectional dimensions the guide hole 62 is larger than the guide pin 61 so that spacings, in this case the visible spacings c1, c2, are present between the guide pin 61 and the peripheral wall of the guide hole 63 on all sides in the centre position of the model head 7. The movements of the model head 7 are thus limited by the stopping of the guide pin 61 against the peripheral wall 63 of the guide hole 62.

The mouth area of the model head 7 is formed by a detachably mounted add-on piece that can be inserted into a corresponding face recess 64 of the model head and is removed in FIG. 8. For reasons of weight and material savings, the hollow-cylindrical neck wall 56 is designed to be hollow so that external and internal walls 65, 66 are present. The latter are connected together in one piece by means of tubular walls 67 surrounding the external areas of the transverse hole 41. With the exception of a number of insertion components the model head 7 consists of plastic.

For additional retaining and/or support of the model head 7 a back-of-the-head support 71 is provided which can be adjusted steplessly or step-wise on the carrier 4, in this case on the bearing rod 29, in the vertical centre plane of the model head 7 and can be fixed in the adopted fixing position in such a way that it is capable of supporting the model head 7 in its settings. The head support 71 consists of a bearing web 72 of flat material such as plastic or metal, to whose free end a support plate 73 is fixed. In the area of its foot end the bearing web 72 is adjustably retained in such a way that the support plate 73 can be swivelled in the vertical plane. Used for this purpose is a curved guide shaped like a circle segment 74 with a correspondingly curved guide shaft 75 into which the bearing web 72 correspondingly curved in its foot area is movably inserted. A foot flange 74a of the curved guide 74 is fixed to a base plate 31 of the bearing rod 29 by means of fixing screws, it surrounding the rounded free end of the neck 16 at a short distance. A rear recess for the curved guide 74 is present in the model bust 6. From the curved longitudinal section 72a the bearing web 72 extends to the support plate 73 with a straight longitudinal section 72b. To fix the bearing web 72 it has provided in it in a longitudinal row latching holes 77 into which a latch nose 78, mounted on the curved guide 74, can latch; this nose is fixed to a one-arm or two-arm latching lever 79, which is swivel-mounted on the curved guide 74, is pretensioned in the latching position by spring force and can be unlatched in the opposite direction, e.g. against the double arm 79a, by finger pressure. At its foot end the curved web section 72a has a terminating slot 72c into which the bearing rod 29 can enter.

Associated with the swivel joint 8 carrying the model head 7 or the model bust 6 is a fixing device 81, operating steplessly or step-wise, which permits a stepless setting of a joint clamping force or frictional force. In this way the swivel joint 8 can be fixed or released or it can also be set in such a way that the fixing force is sufficient to absorb the stresses arising when the model head 7 is being treated but can be overcome manually to swivel the model head 7 with its carrier 32. This greatly simplifies the outlay.

Figure 11:
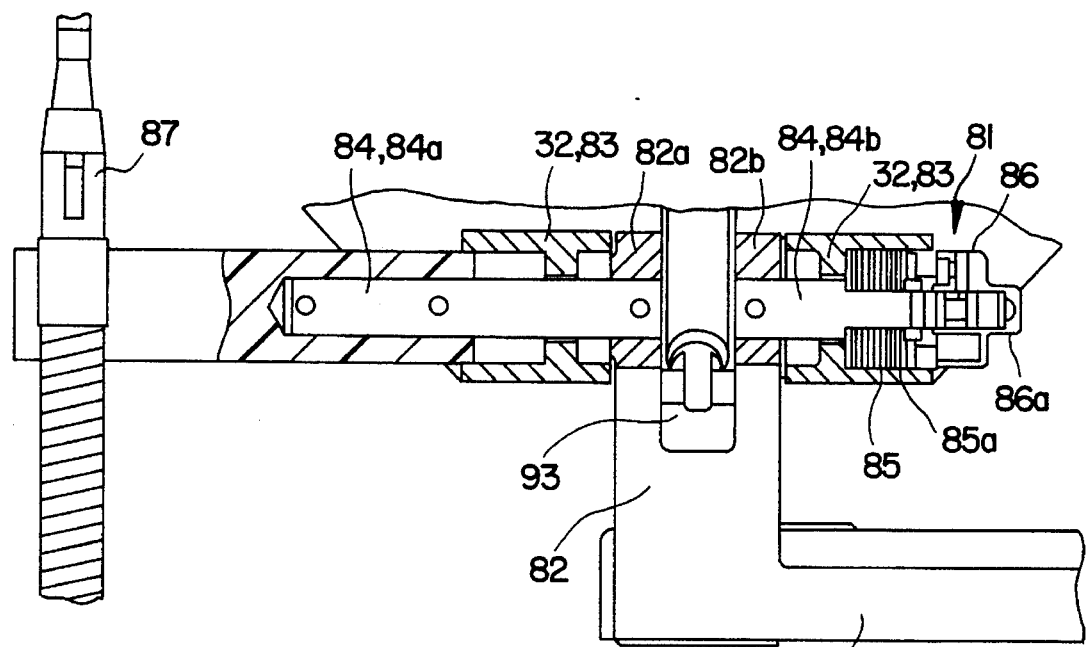
FIG. 11 shows the partial section XI—XI in FIG. 10.

The fixing device 81 is integrated in the mounting of the carrier 32. In this embodiment according to FIG. 11 a joint head 82, which is laterally surrounded by two joint side parts of the carrier 32 in the shape of a fork, projects upwards from the free end of the horizontal bearing arm 5, a horizontal joint axle 84 passing through the joint head 82 and the joint side parts 83 in joint holes and forming the joint. At one end, in this case the right-hand end of the joint axle 84, at least one, preferably several coupling and/or friction discs 85 are provided in pot-shaped end recess 85a of the associated joint side part 83, which form the steplessly adjustable frictionally tight connection between the joint axle 84 and the right-hand joint side part 83. Where there are several friction discs 85 every second one is connected to the joint axle 84 so that it cannot rotate relative to the axle whereas the others are connected to the associated joint side part 83 so that they cannot rotate relative to that part. At its free end the joint axle 84 has an external thread to which a setting nut 86, which has at least one grip element 86a for manual grasping for rotation, is screwed. The swivel joint 8 can be fixed or set in the manner described above by tightening the setting nut 86 to a greater or lesser extent.

The other end of the joint axle 84 is extended by means of an extension piece if necessary and at its free end it carries a mounting for a dental extraction pipe 87, connected to a supply hose, which is suspended in a recess of the joint axle 84 for example.

Figure 12:
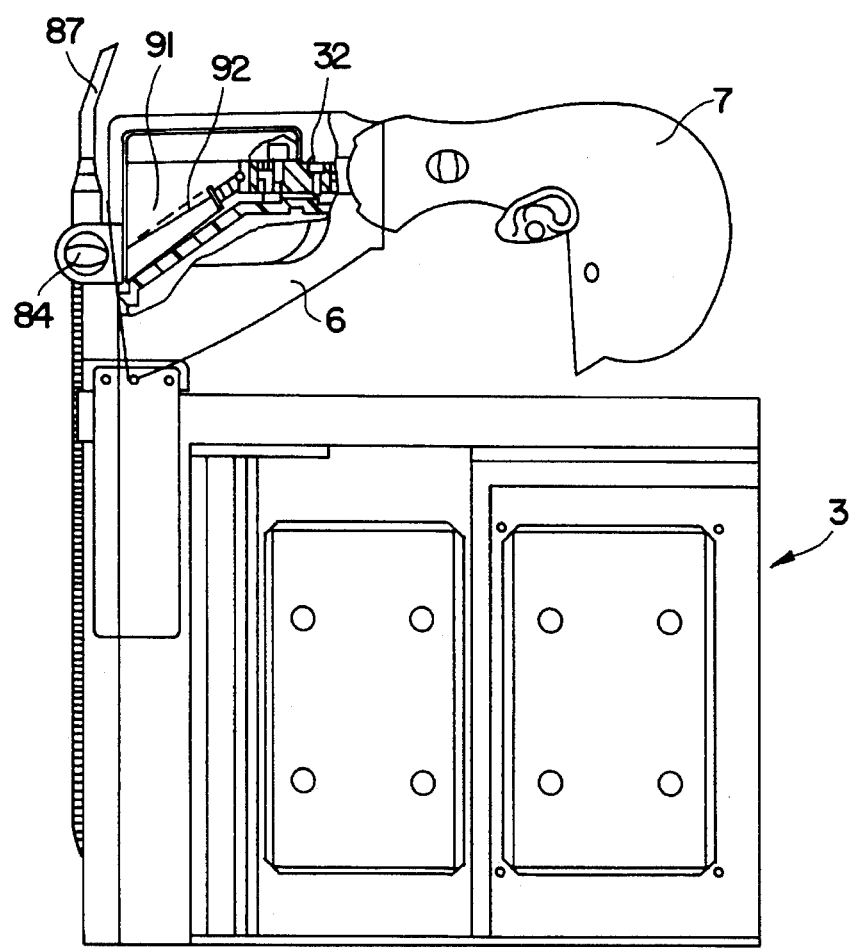
FIG. 12 shows a view of the apparatus corresponding to FIG. 10 with the model bust swivelled in and particular details.

As can be seen from FIG. 12 in particular, arranged between the carrier 32 and the carrier base in this case the horizontal bearing arm 5 or joint head 82 is a swivelling aid 91 which is tensioned when the model head 7 is swivelled with its carrier 4 into the supine disposition according to FIG. 1 or the prone disposition according to FIG. 12 and thus stores an auxiliary force supporting the upward swivelling, which facilitates the manual swivelling between the two above-mentioned dispositions. The swivelling aid 91 can have a pneumatic or a mechanical spring such as a spiral spring. The spring 92 is in the model bust 6. Its upper end is swivel-mounted on an add-on piece of the carrier 32 which is at a distance from the swivel joint 8. The lower end of the spring 92 is swivel-mounted on a fixing point which is displaced forwards with respect to the swivel joint 8 and is preferably somewhat lower. In this case the arrangement and/or length of the spring 92 is so dimensioned that it is tensioned when the model head is in the supine disposition according to FIG. 1 or the prone disposition according to FIG. 12. To enable the model head 7 to swivel to and fro in this way, in the joint head 82 is provided a vertical recess 93 which also crosses the joint axle 84 and thus divides it into two lateral joint axle parts 84a, 84b which are connected to the remaining joint head cheek parts 82a, 82b so as not to rotate. When swivelling to and fro takes place the spring 92 can enter the recess 93 with play for movement and without buckling.

In order to be able to adapt the model head 7 or the model bust 6 to different working position heights independently of their swivel positions, the carrier 4 is mounted on the base 3 so as to be vertically adjustable and fixable in the appropriate height position by means of a height adjustment device 94. Used for this purpose is a vertical bearing column 95, preferably rectangular in cross-section, which is movably mounted in the vertical direction on and/or in a vertical guide 96 of the base 3 and is retained there so that it cannot rotate. In this embodiment the base 3, preferably the front side, particularly the corner, area of one side, the right-hand side in this case, is provided with a vertical guide recess with a cross-sectional shape and size corresponding to the bearing column 95 in which the bearing column 95 is movably mounted in the vertical direction. For vertical displacement purposes a vertical threaded spindle 97 is provided, pivot-mounted in the bearing column 95, and projecting through the upper closed end of the bearing column 95 in a hole and which is or can be connected with its upper end to a crank 98 so that it rotates with the crank. A spindle nut 99, fixed to the base 3, into which the threaded spindle 97 is screwed, is arranged in the hollow bearing column 95 or underneath it. The threaded spindle 97 is rotatable in the bearing column 95 but is immovable in its longitudinal direction so that by screwing or unscrewing the threaded spindle, the bearing column is moved together with the horizontal bearing arm 5 fixed to it and the desired working height of the model head 7 can be set in this way. The bearing arm 5 essentially extends parallel to the front face of the base 3 and carries the model head 7 on the front side of the base 3 in approximately its central position.

Figure 13:
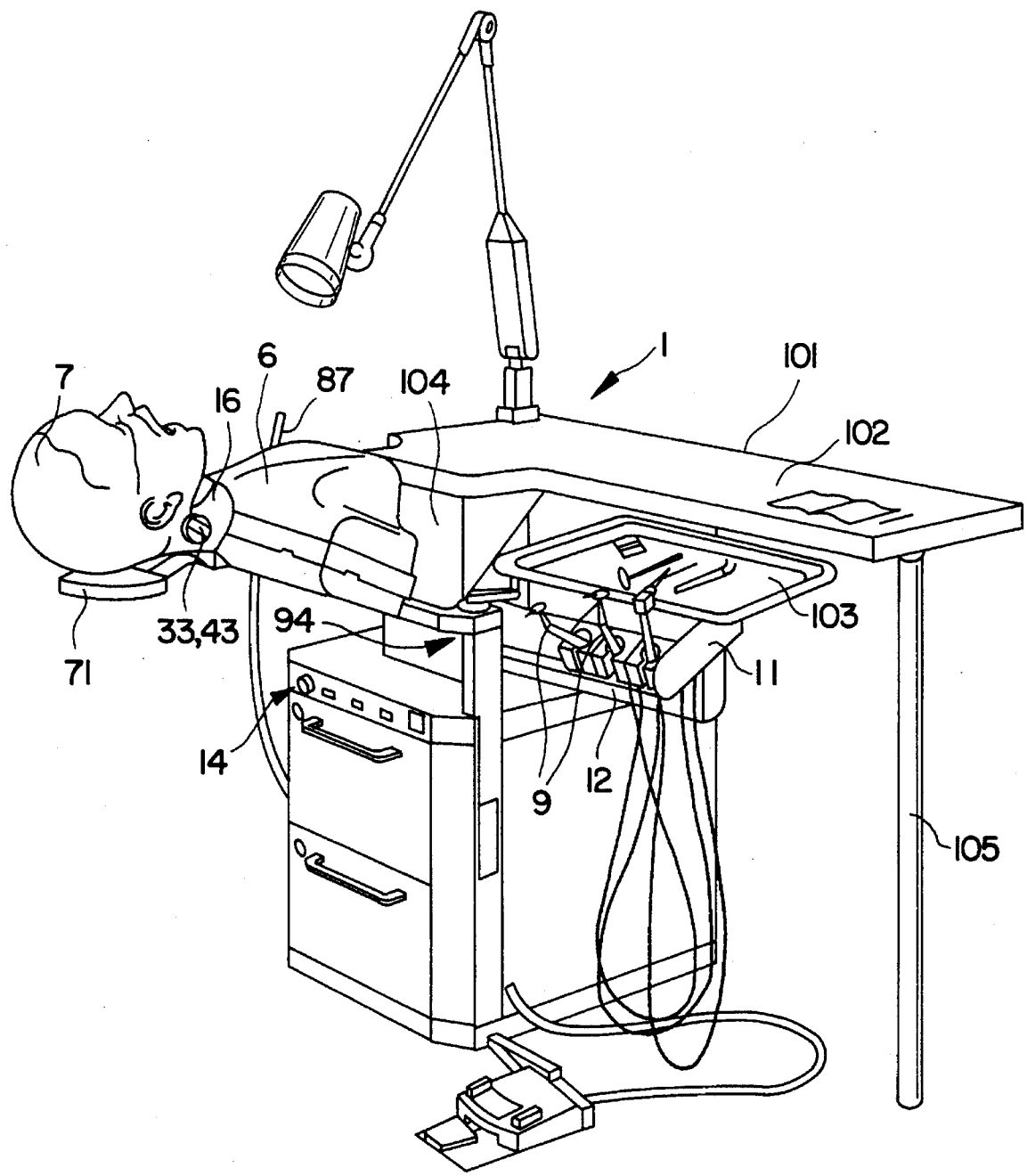
FIG. 13 shows a training and practice apparatus in a modified embodiment.

In the embodiment according to FIG. 13, in which identical or comparable parts are provided with the same reference numbers, a workbench 101, which is above and in the rear area of the base 3 and is preferably widened and/or lengthened towards the side to which the height adjustment device 94 is displaced, is associated with the training and practice apparatus 1 which is stationary in this case. At its left-hand end the work surface 102 is supported on an attachment 104 which is on the base 3, preferably in its rear left-hand corner area. A bench leg 105 is provided to support the right-hand end of the work surface 102.

Figure 14:
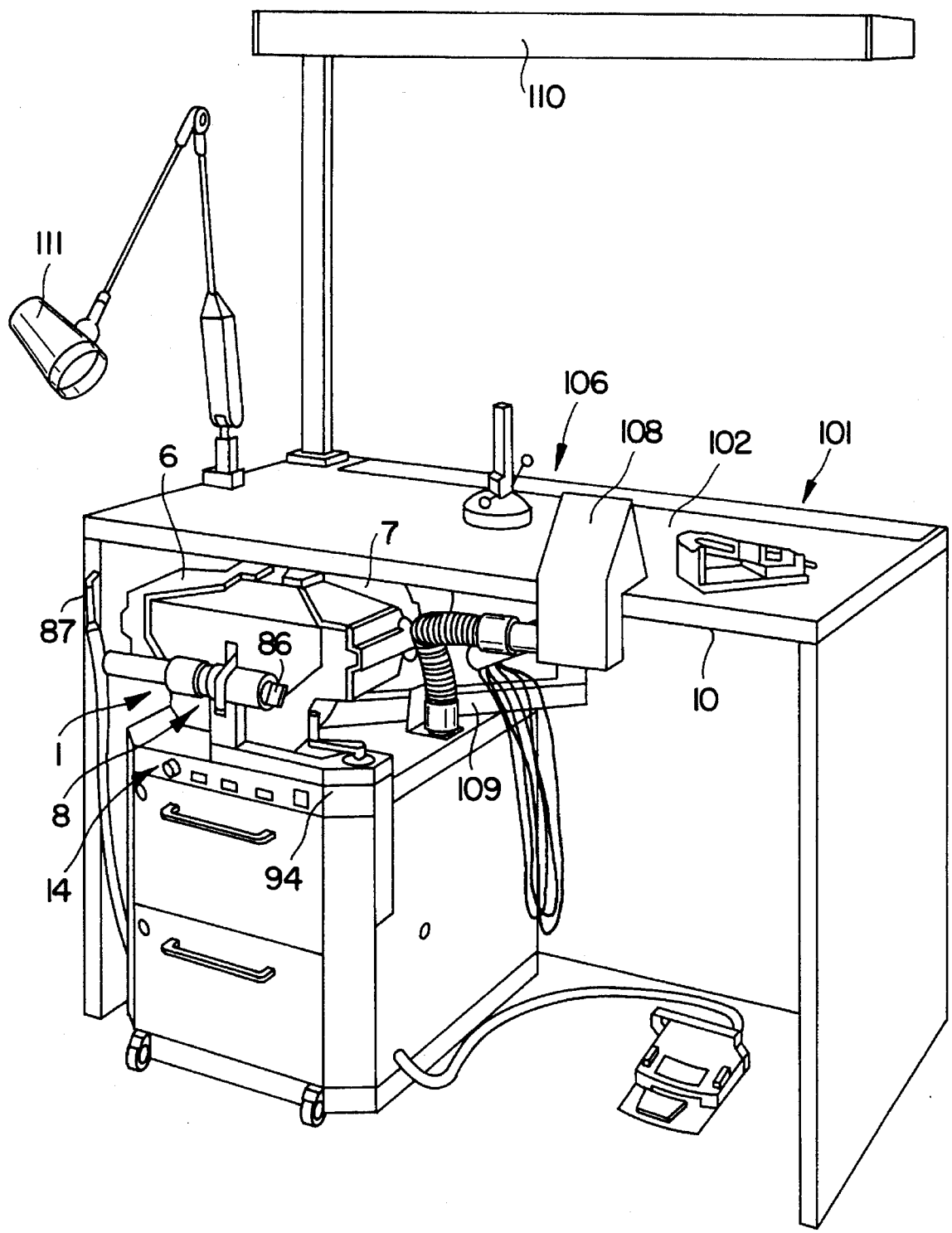
FIG. 14 shows a training and practice apparatus in a further modified embodiment.

In the embodiment according to FIG. 14, in which identical or comparable parts are again provided with the same reference numbers, the dental training and practice apparatus 1 is combined with a bench-like technical dental training and practice apparatus or treatment apparatus 106 which is preferably stationary. In this case the arrangement is such that the dental apparatus 1 can be pushed under the work surface 102 of this apparatus 106 with the model head 7 swivelled into the prone disposition, the workbench 101 of this apparatus 106 being approximately twice as wide as the dental apparatus 1 so that there is a technical dental work station 108 alongside. Associated with the workbench 101 of the technical dental apparatus 106 are treatment tools which are not shown and a dust extraction device 108 which is preferably supplied from a common extraction device also supplying the extraction pipe 87 and associated with the dental apparatus 1 and is mounted on the technical dental training and practice apparatus or treatment apparatus 106, particularly on the technical dental training and practice apparatus or treatment apparatus 106, in particular in the central area of the work station 108 on the work surface 108 or on a bearing arm 109 extending horizontally laterally adjacent to the apparatus 1 and horizontally swivel-mounted in a joint on the base 3. A fixed and/or movable lamp 110, 111 on the technical dental apparatus 106 is jointly associated with this apparatus combination.

All the above-mentioned embodiments can be converted from right-hand to left-hand designs. Among other things this is assured by the laterally swivelling arrangement of the bearing arm 12 and/or 109.

The model bust 6 is detachably fixed to the rod-shaped bearing part 32 (FIG. 2) which is connected to the joint side parts 83 (FIG. 11) in one or several pieces. Easy access to these fixing parts is assured through the back area of the model bust 6 which is completely or partially open. As can be seen from FIG. 15 the model bust 6 with the model head 7 can be detachably fixed by means of a belt fixing device 112 to other practice and/or treatment apparatus also, in particular to the back part 113 of a dentist's chair 114. A belt 115 or a further belt 116 which are preferably longitudinally elastic and can be preferably positively connected to the model bust 6 by means of retaining elements fixed to their ends can be used for this purpose. In this embodiment the retaining elements are formed by C-shaped clasps 117 of metal or plastic each of which positively overlaps a preferably continuous retaining web 118 in the shoulder area and at the side of the model bust 6, the web preferably being moulded onto the model bust 6 made of plastic. To ensure the positive retention, the retaining web 118 is undercut on one or both sides so that the clasps 117 can clasp it positively. In the fitted position the clasps 117 can be pushed along on the retaining web 118 and they can thus be placed onto and/or removed from the end of the associated retaining web 118. Preferably each retaining web 118 is provided with one or more entry and exit openings 119 for the clasps 117 which are formed by single-sided or two-sided tapers or waists of the retaining web 118 into which the clasps 117 can be inserted or from which they can be removed. In this embodiment two belts 115, 116 are provided, one of which encircles the back part 113 in the chest area of the model bust 6 and the other encircles the back part 113 in the moulded nape area.

Figure 15:
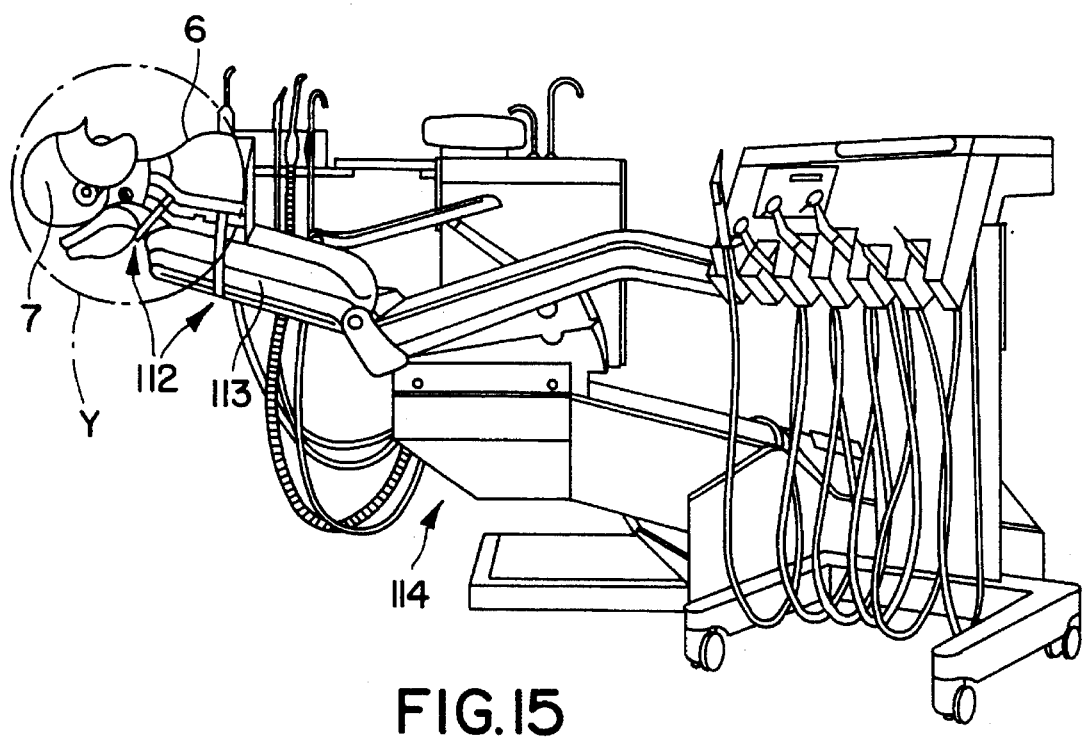
FIG. 15 shows a dentist's chair equipped with a model head.
Figure 16:
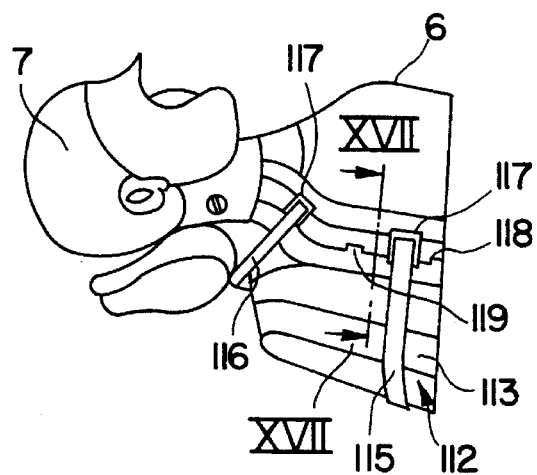
FIG. 16 shows an enlarged view of the detail marked Y in FIG. 15.
Figure 17:
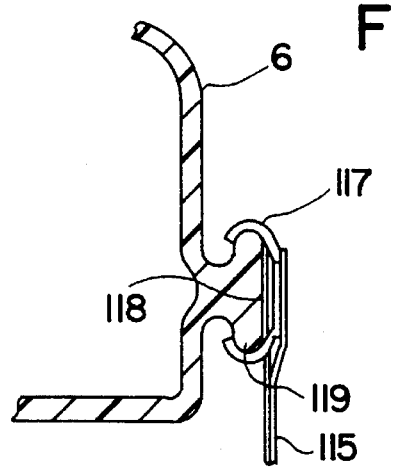
FIG. 17 shows the partial section XVII—XVII in FIG. 16.

The arrangement according to FIG. 15 thus makes it possible for training and practice work to be carried out on a customary dentist's chair 114 also and hence in a practice and for the dentist's chair 114 to be converted with ease.

We claim:

1. Training and practice apparatus for simulating and practicing clinical dental processes, said apparatus comprising a model head, a neck which carries the head, a carrier, a ball joint located within said neck and interconnecting said head and said carrier so that said head can thereby be swivelled into different working positions, a fixing device arranged with said ball joint within said neck, said fixing device being adjustable to fix said ball joint and thereby clamp said head in any swivel position within a given range, and to release said ball joint and thereby release said head for movement to a different swivel position, a tensioning element for adjusting said fixing device, said tensioning element extending from said fixing device within said neck out through an opening in the periphery of the neck, and a handle on the outer surface of said neck and connected to said tensioning element for moving same to adjust said fixing device.

2. Training and practice apparatus according to claim 1, wherein said tensioning element is movable to effect said fixing and releasing without displacement of its axis.

3. Training and practice apparatus for simulating and practicing clinical dental processes with a model bust, said apparatus comprising a chest part, a carrier extending out from the chest part, a neck, a head, a joint mounting said head on the carrier so that the head can be swivelled into different working positions and fixed in an adopted swivel position, said joint being arranged in the neck, the neck having an engagement recess opening approximately coaxially at its bottom end, said carrier comprising a bearing rod which extends into the engagement recess in the neck, said joint being arranged on the bearing rod, the bearing rod extending into the chest, and said neck having a rounded bottom end which enters into an opening on the chest part.

4. Training and practice apparatus for simulating and practicing clinical dental processes, said apparatus comprising:

a model head, a head carrier comprising a bearing rod, a ball joint which mounts said head on said head carrier so that said head can thereby be swivelled into different working positions and fixed in an adopted swivel position relative to said carrier, a neck fixed to and bearing the head, said neck having an engagement recess which opens approximately at its bottom end, and a crosspiece in the neck bounding the engagement recess, said crosspiece being connected to one portion of the ball joint, one end of said bearing rod extending into said recess and being connected to another portion of the ball joint.

5. Training and practice apparatus according to claim 4 wherein said apparatus includes a bust having a chest part fixed relative to said carrier, a region of said neck being movable along a region of said chest part as said head is swivelled, said scale being arranged on said regions.

6. Training and practice apparatus according to claim 5, characterized in that the neck is a tubular part fixed to the head and the carrier is a rod fixed to the chest part and extending into the neck from below.

7. Training and practice apparatus for simulating and practicing clinical dental processes, said apparatus comprising:

a model head, a carrier, a fixable ball joint which mounts said head on said carrier so that said head can be swivelled into different working positions and fixed in an adopted swivel position, a neck in which the ball joint is arranged, and a measurement apparatus for measurement and/or display of at least one of pitch, lateral and rotary movement variable of the model head, said measurement apparatus having a first portion fixed relative to the carrier and another portion fixed relative to the head, and further having a scale on at least one of said portions for indicating said at least one movement variable.

8. Training and practice apparatus for simulating and practicing clinical dental processes, said apparatus comprising:

a model head, a carrier, a joint for mounting said head on said carrier so that said head can be swivelled relative to said carrier to different working positions and then fixed in an adopted working position, a neck within which said joint is located, said neck being fixed to and movable together with said head, said joint including a lock which may be set for locking the head in any working position and released for allowing the head to be moved to a different working position, and a lock setting and releasing element extending from said lock and passing transversely through a hole in the neck, said setting and releasing element being accessible from outside said neck.

9. Training and practice apparatus according to claim 8, wherein said setting and releasing element is movable to effect said setting and fixing without displacement of its axis.

10. Training and practice apparatus according to claim 8, wherein the releasable lock includes a hand screw.

11. Training and practice apparatus according to claim 8, wherein the joint is arranged in the a central longitudinal are of the neck.

12. Training and practice apparatus for simulating and practicing clinical dental processes, said apparatus comprising:

a model head, a carrier, a joint for mounting said head on said carrier so that said head can be swivelled relative to said carrier to different working positions and then fixed in an adopted working position, a chest part having an opening at the top thereof, a neck within which said joint is located, said neck being fixed to and movable together with said head, said neck having a rounded bottom end which enters into said opening in the chest part, said neck having a recess opening at its bottom end, and said carrier comprising a bearing rod which extends from said chest part through said recess opening in said neck to a stationary portion of said joint within said neck, said joint including a lock which may be set for locking the head in any working position and released for allowing the head to be moved to a different working position, and a lock setting and releasing element extending from said lock and passing transversely through a hole in the neck, said setting and releasing element being accessible from outside said neck.

13. Training and practice apparatus for simulating and practicing clinical dental processes, said apparatus comprising:

a model head, a carrier, a joint for mounting said head on said carrier so that said head can be swivelled relative to said carrier to different working positions and then fixed in an adopted working position, said joint comprising a ball joint formed between the end of the bearing rod facing the head and a crosspiece in the neck, a neck within which said joint is located, said neck being fixed to and movable together with said head, said joint including a lock which may be set for locking the head in any working position and released for allowing the head to be moved to a different working position, and a lock setting and releasing element extending from said lock and passing transversely through a hole in the neck, said setting and releasing element being accessible from outside said neck.

14. Training and practice apparatus for simulating and practicing clinical dental processes, said apparatus comprising:

a model head, a carrier, a joint for mounting said head on said carrier so that said head can be swivelled relative to said carrier to different working positions and then fixed in an adopted working position, a neck within which said joint is located, said neck being fixed to and movable together with said head, said joint including a lock which may be set for locking the head in any working position and released for allowing the head to be moved to a different working position, a lock setting and releasing element extending from said lock and passing transversely through a hole in the neck, said setting and releasing element being accessible from outside said neck, and a position measurement device which includes at least one scale, said position measurement device being mounted on the head for indicating at least one of the pitch, lateral and rotary movement of the head.

15. Training and practice apparatus for simulating and practicing clinical dental processes, said apparatus comprising:

a model head, a carrier, a joint for mounting said head on said carrier so that said head can be swivelled relative to said carrier to different working positions and then fixed in an adopted working position, a neck within which said joint is located, said neck being molded to the head in one piece and movable together with said head, said joint including a lock which may be set for locking the head in any working position and released for allowing the head to be moved to a different working position, and a lock setting and releasing element extending from said lock and passing transversely through a hole in the neck, said setting and releasing element being accessible from outside said neck.

16. Training and practice apparatus for simulating and practicing clinical dental processes, said apparatus comprising:

a model head, a carrier, a joint for mounting said head on said carrier so that said head can be swivelled relative to said carrier to different working positions and then fixed in an adopted working position, a neck within which said joint is located, said neck being fixed to and movable together with said head, said joint including a lock which may be set for locking the head in any working position and released for allowing the head to be moved to a different working position, and a lock setting and releasing element extending from said lock and passing transversely through a hole in the neck, said setting and releasing element being accessible from outside said neck, said joint comprising a ball and socket joint whose socket wall is elastically tensionable against the ball by means of said lock setting and releasing element.

17. Training and practice apparatus for simulating and practicing clinical dental processes, said apparatus comprising:

a model bust, said bust including:

a chest part, a neck, and a head;

a carrier;

a releasably lockable joint having first and second relatively movable portions connected, respectively, to said head and to said carrier, for mounting said head on said carrier in a manner such that said head can be swivelled into different working positions and then fixed in an adopted working position, said joint being located within the neck;

said neck being formed with an engagement recess opening at its bottom end;

said carrier comprising a bearing rod which is mounted in said chest part and which extends into said engagement recess in said neck where it is attached to said second relatively movable portion of said joint; and a movement limitation guide arranged to limit the degrees of freedom of relative movement between said portions of said joint in such a way that the corresponding head movement may correspond to the anatomical possibilities of a average human being, said movement limitation guide being formed by a guide hole arranged in one of said joint portions and a guide pin projecting radially inwards from the other of said joint portions and engaging in the guide hole.

18. Training and practice apparatus according to claim 1, wherein said joint has first and second relatively movable portions, said first portion being attached to said head, wherein said apparatus includes a chest part, said neck having a rounded bottom end which enters into an opening of the chest part, the neck further having a recess opening at its said bottom end, and wherein said carrier comprises a bearing rod which extends from said chest part and through said recess opening in said neck and which is connected to said second relatively movable portion of said joint within said neck.

19. Training and practice apparatus according to claim 17, wherein said joint is a ball joint formed between an end of the bearing rod which faces the head and a crosspiece in the neck.

20. Training and practice apparatus according to claim 19, wherein a position measurement device which includes at least one scale, is mounted on the head for indicating at least one of the pitch, lateral and rotary movements of the head.

21. Training and practice apparatus for simulating and practicing clinical dental processes, said apparatus comprising:

a model bust which comprises;

a chest part, a neck, a head, and a carrier;

a joint on which said head is mounted, said joint being capable of being swivelled so that said head can be swivelled into different working positions and fixed in an adopted swivel position, said joint being arranged within said neck;

said neck having an engagement recess opening approximately coaxially at its bottom end;

said carrier comprising a bearing rod which is mounted in the chest part and which extends into said engagement recess opening in said neck and is attached to a portion of said joint within said neck; and a measurement device arranged on said head for measuring at least one of the pitch movement, lateral movement and rotary movement of said head, said measurement device having at least one scale for measuring and displaying said at least one movement.

22. Training and practice apparatus according to claim 21, wherein the neck is a tubular part fixed to the head.

* * * * *